United States Patent
Kant et al.

(10) Patent No.: US 8,423,760 B2
(45) Date of Patent: Apr. 16, 2013

(54) METHOD AND SYSTEM FOR REDUCING PACKET OVERHEAD FOR AN LTE ARCHITECTURE WHILE SECURING TRAFFIC IN AN UNSECURED ENVIRONMENT

(75) Inventors: Nishi Kant, Fremont, CA (US); Heeseon Lim, Cupertino, CA (US)

(73) Assignee: Stoke, Inc., Santa Clara, CA (US)

( * ) Notice: Subject to any disclaimer, the term of this patent is extended or adjusted under 35 U.S.C. 154(b) by 389 days.

(21) Appl. No.: 12/711,140

(22) Filed: Feb. 23, 2010

(65) Prior Publication Data

US 2011/0208959 A1   Aug. 25, 2011

(51) Int. Cl.
*H04L 29/06* (2006.01)
*H04L 9/32* (2006.01)
*G06F 17/00* (2006.01)
*G06F 15/173* (2006.01)

(52) U.S. Cl.
USPC ............. 713/151; 713/153; 713/168; 726/12; 726/14; 709/223

(58) Field of Classification Search ................... 713/151, 713/153, 168; 726/12, 14; 709/223
See application file for complete search history.

(56) References Cited

U.S. PATENT DOCUMENTS

2006/0073811 A1* 4/2006 Ekberg .......................... 455/411
2010/0097992 A1* 4/2010 Velev et al. .................... 370/328

* cited by examiner

*Primary Examiner* — Aravind Moorthy
(74) *Attorney, Agent, or Firm* — Blakely, Sokoloff, Taylor & Zafman LLP (57) ABSTRACT

A first packet is received at a network element from an E-UTRAN Node B (eNB) of an E-UTRAN access network via a secured communications tunnel of a secured connection, where the first packet encapsulates a second packet therein. It is determined whether the network element serves both a security gateway functionality and a serving gateway functionality of a core packet network based on the first packet and the second packet. The network element negotiates with the eNB to switch further communications from a tunnel mode to a transport mode of the secured connection if it is determined that the network element serves both the security gateway functionality and the serving gateway functionality. Thereafter, the network element exchanges further packets with the eNB via the transport mode of the secured connection after the eNB switches from the tunnel mode to the transport mode.

21 Claims, 7 Drawing Sheets

METHOD AND SYSTEM FOR REDUCING PACKET OVERHEAD FOR AN LTE ARCHITECTURE WHILE SECURING TRAFFIC IN AN UNSECURED ENVIRONMENT

FIELD OF THE INVENTION

Embodiments of the present invention relate generally to third generation partnership project (3GPP) networks (e.g., general packet radio service or GPRS and its evolution to universal mobile telecommunications system or UMTS and beyond). More particularly, embodiments of this invention relate to a method for reducing packet overhead for an LTE architecture while securing the traffic in an unsecured network environment.

BACKGROUND

The mobile industry is moving towards the next generation technology with better performance and throughput to support traffic such as real-time broadband streaming services. One of such technologies that is gaining most support from the industry is LTE (long term evolution) defined by 3GPP and pursued at 3GPP2 as well.

Figure 1:
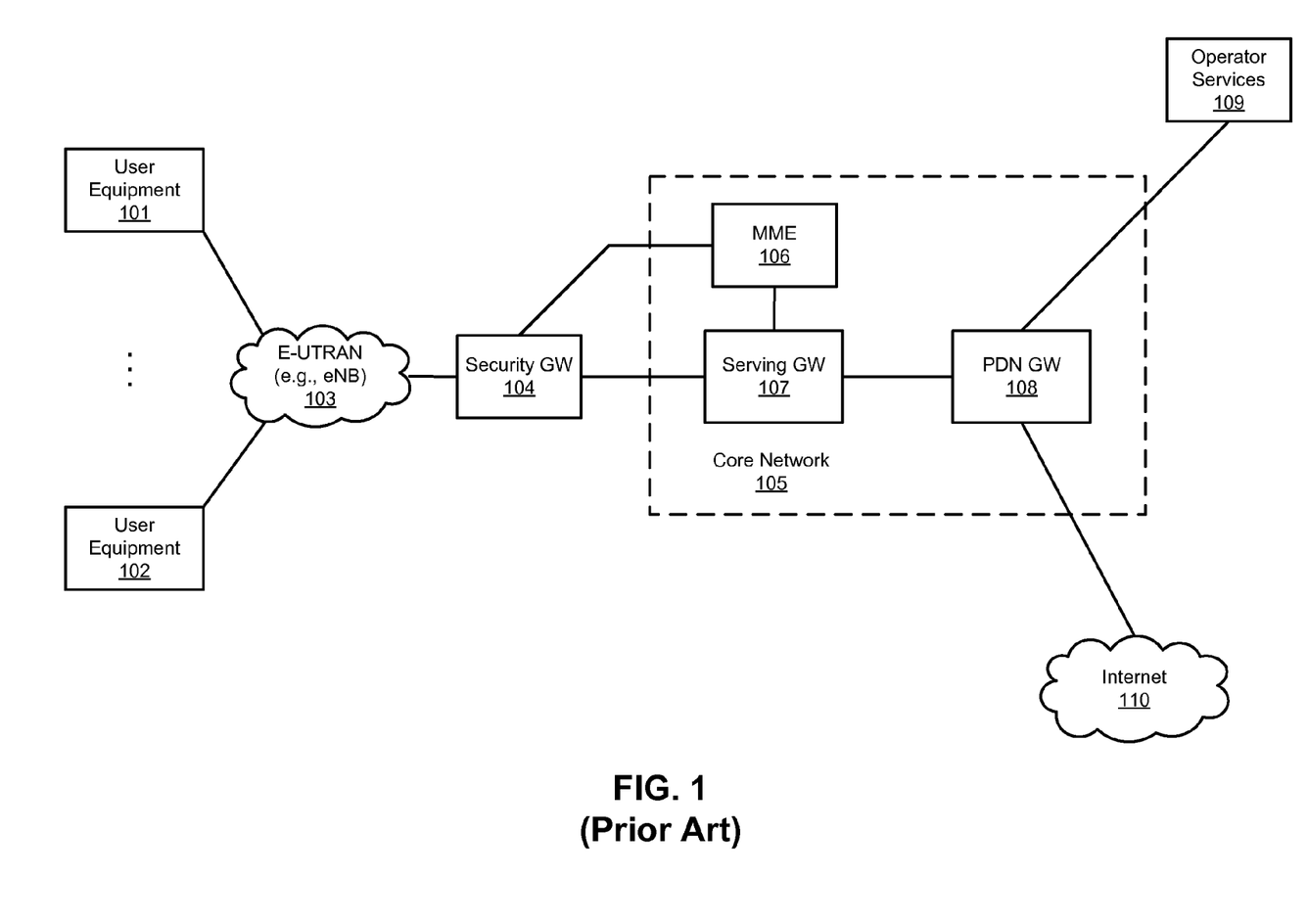
FIG. 1 is a block diagram illustrating a typical LTE architecture.

LTE provides a flatter architecture with less network nodes between a user and a destination, together with bigger throughput to support broadband traffic. FIG. 1 is a block diagram illustrating the LTE architecture. As shown in FIG. 1, there could be only two nodes between user equipment (UE) (e.g., UEs 101-102) and the services (e.g., eNodeB or eNB 103), and a serving gateway (Serving GW or SGW) 107 and a packet data network gateway (PDN-GW) 108. Serving GW 107 terminates the interface from and towards evolved universal mobile telecommunications system (UMTS) terrestrial radio access network (RAN) (E-UTRAN) and provides connectivity to PDN-GW 108, which is coupled to operator services node 109 and the Internet 110. Serving GW 107 acts as a mobility anchor for inter-eNB handover and intra-3GPP handover between 3G and LTE. Mobile management entity (MME) 106 is responsible for authentication and critical management for mobile devices as well as for tracking and paging procedures for mobiles in the idle mode. MME 106 authorizes bearer activation and/or deactivation including SGW and PDN GW selection. PDN GW 108 is the permanent IP point-of attachment for access via the E-UTRAN. PDN DW 108 performs IP policy and charging enforcement on packet flows to and from UEs.

The LTE architecture also assumes all-Internet protocol (IP) infrastructure in the network. In this all-IP environment, it is possible and desirable to use the lowest cost IP transport from any provider as the backhaul for E-UTRAN. This reduces the backhaul cost from the operators, but it also introduces a security and privacy issue where an operator's assets (e.g., eNB 103, core network 105) become vulnerable to attacks from the open IP network. Moreover, the confidentiality of signaling and management information may also be lost. In order to address these issues, in some of the deployment scenarios, eNB 103 is made as a secure end point and a security gateway (Security GW or SeGW) 104 is located at the edge of the operator network 105 to secure both ends and provides adequate service level agreements (SLAs).

As shown in FIG. 1, the security gateway 104 is located at the edge of the operator's core network 105 and establishes IP security (IPsec) security association (SA) with eNB 103. This ensures that the traffic that is passing between the eNB 103 and the core network nodes (e.g., SGW 107) is secured based on the operator's policy while operators benefit from the least cost open IP transport. For example, traffic between eNB 103 and Serving GW 107 over S1-U interface is securely protected over open IP transport.

This architecture provides the flexibility, efficiency, and security to the operators. However, the introduction of IPsec means additional IPsec overhead between eNB 103 and the security GW 104. As eNB 103 needs to support many UEs residing in its area, the IPsec needs to operate in a tunnel mode, which requires significant overhead processes.

Figure 2:
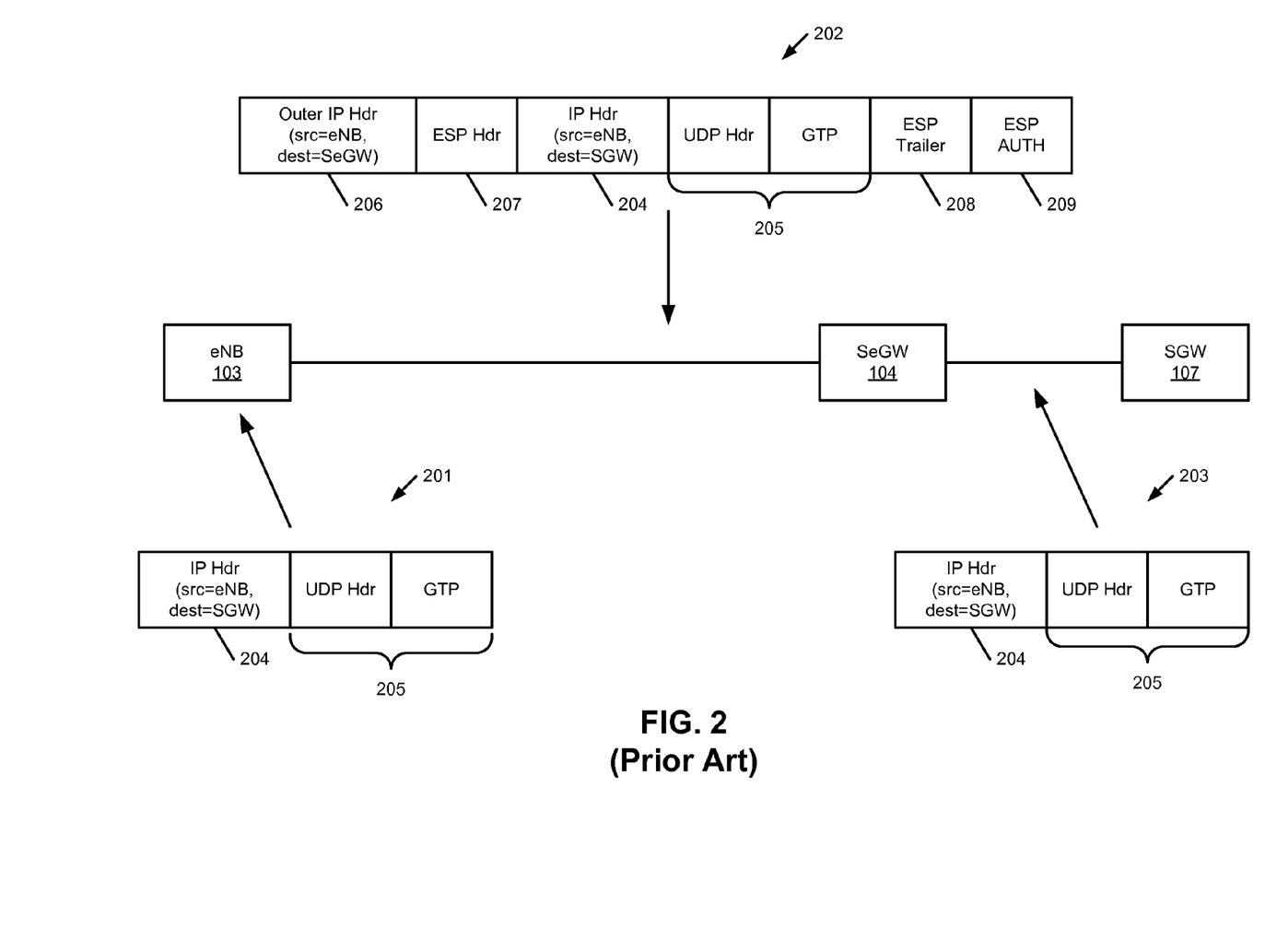
FIG. 2 is a diagram illustrating packet formats involved in a typical LTE architecture.

FIG. 2 is a diagram illustrating typical packet processes between an eNB node and Security GW in a tunnel mode. When eNB 103 receives a packet 201 from a UE to send toward the core network (CN), eNB 103 encapsulates packet 201 in another packet 202 constructed as per protocols relevant to the S1 interface and then sends it to Serving GW 104. This is composed of IP header 204 (with source IP address of eNB 103 and destination IP address of Serving GW 104), the UDP header and GPRS tunneling protocol (GTP) payload as a whole referred to as a payload 205, which contains the UE's IP address and the destination IP address. With the overlaid security, the S1 packet needs to be sent inside an IPsec tunnel. Thus, eNB 103 adds an ESP trailer 208 to the S1 packet and the S1 packet itself (including IP header 204, UDP header and GTP 205, and ESP trailer 208) is encrypted. Then the ESP header 207 and ESP authenticator 209 is added as well as the outer IP header 206 having source IP address of eNB 103 and the destination IP address of Security GW 104. When Security GW 104 receives the encrypted packet 202, it removes all the IPsec related headers and extracts the S1 packet 203 (i.e. inner IP header, UDP header, and GTP) to forward packet 203 to the IP destination, i.e. Serving GW 107.

Even if the open IP transport provides cost effectiveness and flexibility, the tunnel inside another tunnel scenario as described above would lower the total throughput as well as may cause unnecessary fragmentation and reassembly, especially, when an operator moves from its own backhaul to an open backhaul network.

ESP is a member of IPsec protocol suite. In IPsec it provides origin authenticity, integrity, and confidentiality protection of packets. ESP does not protect the IP packet header. However, in a tunnel mode, where the entire origin IP packet (e.g., packet 201) is encapsulated with a new packet header (e.g., outer IP header 206) added, ESP protection is afforded to the whole inner IP packet (including the inner IP header 204) while the outer header remains unprotected. ESP operates directly on top of IP.

SUMMARY OF THE DESCRIPTION

A first packet is received at a network element from an evolved universal mobile telecommunications system (UMTS) terrestrial radio access network (RAN) (E-UTRAN) Node B (eNB) of an E-UTRAN access network via a secured communications tunnel of a secured connection, where the first packet encapsulates a second packet therein. It is determined whether the network element serves both a security gateway functionality and a serving gateway functionality of a core packet network based on the first packet and the second packet. The network element negotiates with the eNB to switch further communications from a tunnel mode to a transport mode of the secured connection if it is determined that the network element serves both the security gateway functionality and the serving gateway functionality. Thereafter, the network element exchanges further packets with the eNB via the transport mode of the secured connection after the eNB switches from the tunnel mode to the transport mode.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

As described above, the mobile industry is moving towards LTE architecture to support broadband traffic with less delay. With all-IP architecture, it is beneficial to use an open IP network as its transport, but this is possible with end-to-end security between network nodes with adequate SLAs. This can be supported by introducing a security gateway at the edge of the operator network. But this also introduces additional overhead caused by IPsec. Therefore, the introduction of security GW makes it possible to use cheaper and flexible open IP as the transport but at the cost of additional overhead.

According to some embodiments, a multi-purpose security gateway (MP-SeGW or MPSG) is introduced having a capability to combine certain functionalities of a Security GW and a Serving GW, which reduces the overhead introduced by an IPsec tunnel without compromising the security and the routing capability. Using an MPSG, it is possible to optimize the packet handling in LTE architecture using an open IP network as a transport mechanism. Moreover, in some embodiments, the MPSG includes an analysis capability in which a security unit determines whether such an optimization is possible and then takes necessary steps to negotiate a suitable security association with an eNB node.

Figure 3:
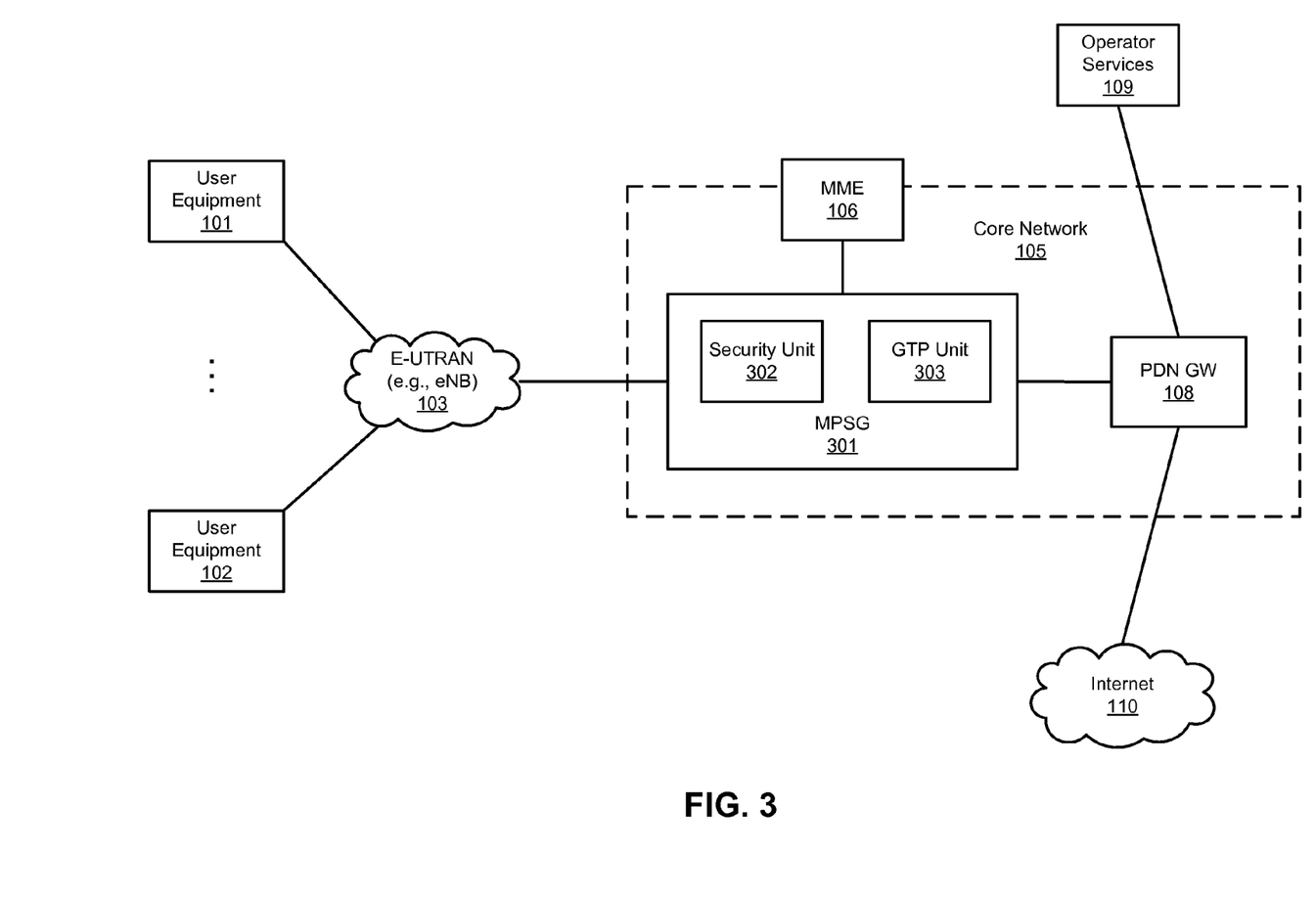
FIG. 3 is a block diagram illustrating an LTE network configuration according to one embodiment of the invention.

FIG. 3 is a block diagram illustrating an LTE network configuration according to one embodiment of the invention. Referring to FIG. 3, similar to the network configuration as shown in FIG. 1, one or more UEs 101-102 communicatively coupled to packet core network 105 via an eNB 103 of an E-UTRAN access network. In one embodiment, a MPSG 301 is introduced at an edge of core network 105, where MPSG 301 includes a security unit 302 and a GTP unit 303. Security unit 302 may include some or all of the functionalities of a Security GW (e.g., Security GW 104) while the GTP unit 303 may include some or all of the functionalities of a Serving GW (e.g., Serving GW 107). Security unit 302 is responsible for handling IPsec processes of packets exchanged between MPSG 301 and eNB 103. GTP unit 303 is responsible for handling the GTP payload of packets after the IPsec has been terminated by the security unit 302, before reaching PDN GW 108 in an attempt to reach operator services 109 and/or Internet 110.

Since MPSG 301 has the capability to support GTP, it essentially absorbs that part of Serving GW's role into a Security GW, making these two types of protocol handling taken place in one network node. Of course, the MPSG could include other relevant functions of a Serving GW and become a combined Security GW and Serving GW. As shown in FIG. 3, the MPSG 301 terminates the IPsec and also serves as an end point of GTP signaling protocol.

In one embodiment, when MPSG 301 receives an IPsec packet from eNB 103 via an IPsec tunnel, MPSG 301 determines that MPSG 301 itself operates as both a Security GW and a Serving GW. For example, MPSG 301 may examine both the inner IP header and the outer IP header to determine whether both destination IP addresses in both IP headers are identical and are the same as the IP address of MPSG 301. If so, MPSG 301 may renegotiate with eNB 103 to transition the IPsec session from a tunnel mode into a transport mode, where in the transport mode, less overhead packet process is needed.

IPsec can be implemented in a host-to-host transport mode, as well as in a network tunnel mode. In transport mode, only the payload (e.g., the data being transferred) of an IP packet is encrypted and/or authenticated. The routing is intact, since the IP header is neither modified nor encrypted. Transport mode is used for host-to-host communications. In tunnel mode, the entire IP packet (e.g., data and IP header) is encrypted and/or authenticated. It is then encapsulated into a new IP packet with a new IP header (e.g., outer IP header). Tunnel mode is used for network-to-network communications, host-to-network communications, and host-to-host communications.

Figure 4A:
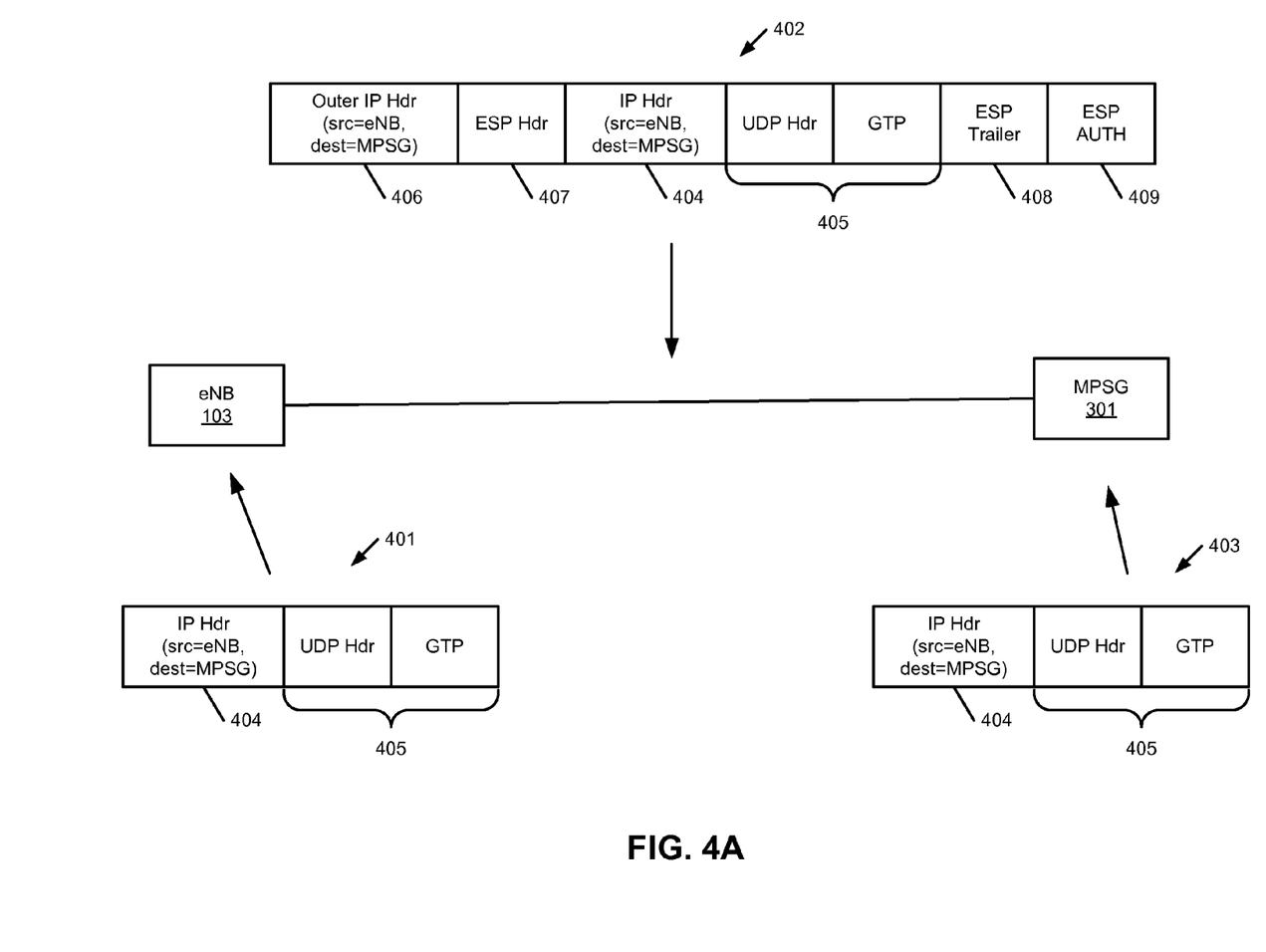
FIGS. 4A and 4B are diagrams illustrating typical packet processes between an eNB node and a MPSG in a tunnel mode and a transport mode according to one embodiment.

FIG. 4A is a diagram illustrating typical packet processes between an eNB node and an MPSG in a tunnel mode according to one embodiment. Referring to FIG. 4A, when eNB 103 receives a packet 401 from a UE to send toward the core network (CN), eNB 103 encapsulates packet 401 in another packet 402 constructed as per protocols relevant to the S1 interface and then sends it to MPSG 301. This is composed of IP header 404 (with a source IP address of eNB 103 and a destination IP address of MPSG 301), UDP header and GTP payload as a whole referred to as a payload 405, which contains the UE's IP address and the destination IP address. In addition, eNB 103 adds an ESP trailer 408 to the packet and the packet itself (including IP header 404, UDP header and GTP 405, and ESP trailer 408) is encrypted. Then the ESP header 407 and ESP authenticator 409 are added as well as the outer IP header 406 having the source IP address of eNB 103 and the destination IP address of MPSG 301. When MPSG 301 receives the encrypted packet 402, it removes all the IPsec related headers and extracts the packet 403 (i.e. inner IP header, UDP header, and GTP) and performs any GTP related processes on packet 403.

Thus, the packet structure as shown in FIG. 4A is same as a configuration having separate Serving and Security GWs as shown in FIG. 2, except the inner destination IP address is the same as the IP address of MPSG 301. There is still the same overhead between eNB 103 and the MPSG 301. However, the source and the destination IP addresses for both inner IP header 404 and outer IP header 406 are identical. The purpose of the outer IP header 406 is to identity a security endpoint and the inner IP header is used to identify a GTP processing entity. In this case, since the security endpoint and the GTP processing entity is the same (e.g., within the same network element, MPSG 301), both inner and outer IP headers have the same IP addresses.

In one embodiment, as MPSG 301 realizes that it serves for both purposes of a security endpoint and a GTP processing entity, the MPSG 301 establishes or negotiates a new IPsec SA with eNB 103 to reduce the overhead processes between MPSG 301 and eNB 103, by switching from an IPsec tunnel mode to an IPsec transport mode. MPSG 301 then uses the IPsec transport mode between eNB 103 and MPSG 301, instead of the tunnel mode, to remove one IP-in-IP overhead without impacting security.

Figure 4B:
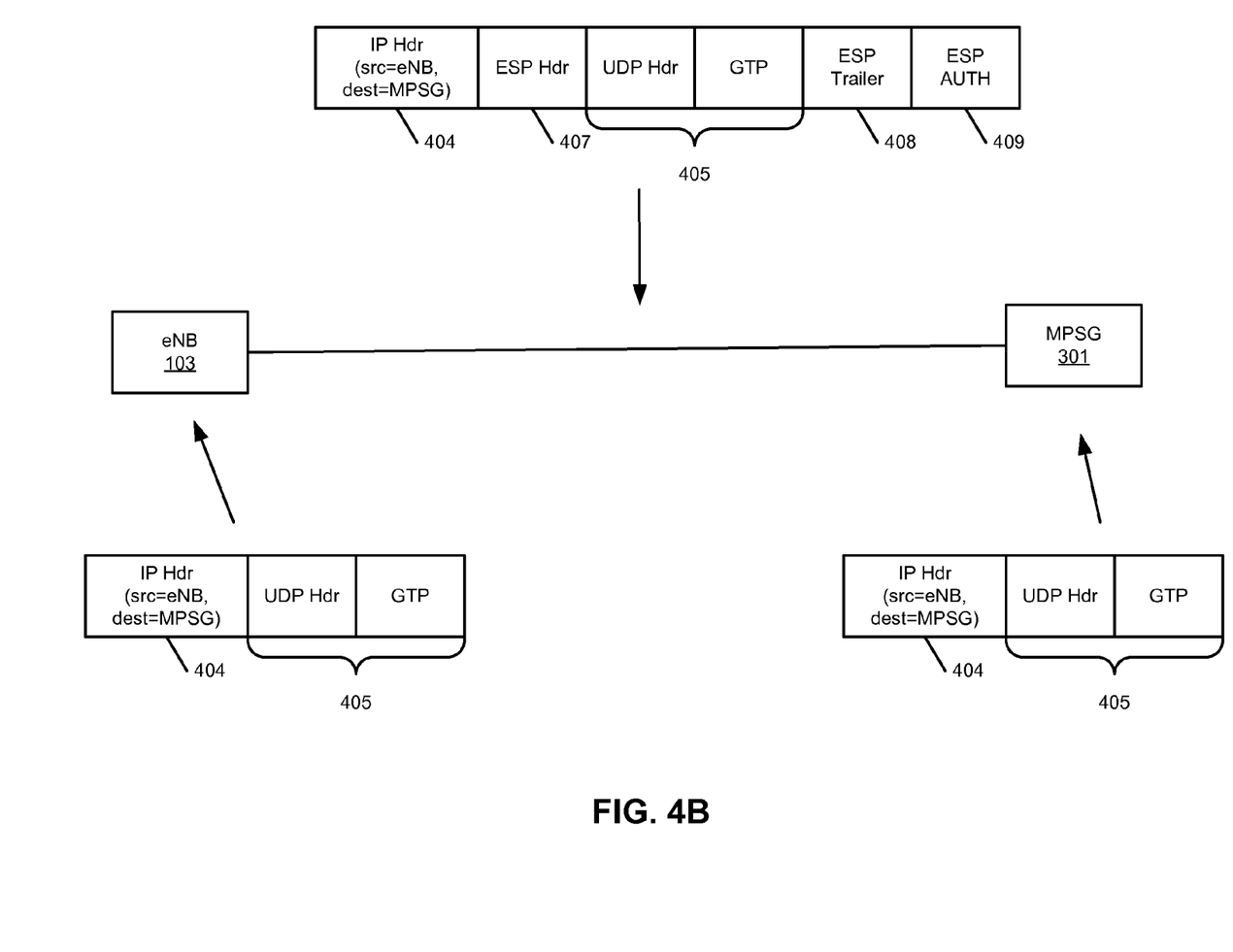

FIG. 4B is a diagram illustrating the optimized packet structure between an eNB and an MPSG using the IPsec transport mode according to one embodiment. As in the case with IPsec tunnel mode, eNB 103 composes the payload with IP header 404 (with source IP address of eNB 103 and destination IP address of MPSG 301), UDP header and GTP 405. To send the packet to the MPSG 301, eNB 103 encrypts and integrity-protects the packet, but this time without the overhead of IP-in-IP. The IP header 404 is preserved in IPsec transport mode and only the ESP overhead is added to the payload 405, which results in packet 402. When MPSG 301 receives packet 402, it decrypts packet 402 to restore the original GTP payload to be forwarded to a PDN-GW.

Thus, with the MPSG's capability to serve as both IPsec endpoint and GTP endpoint, to identify such a capability by comparing the destination IP addresses of inner and outer IP, and to switch to an IPsec transport mode, it is possible to provide an optimal deployment of eNBs by reducing the IP-in-IP overhead without compromising the security. Reduced overhead on user plane improves the user experience, especially with multi-media broadband data.

Figure 5:
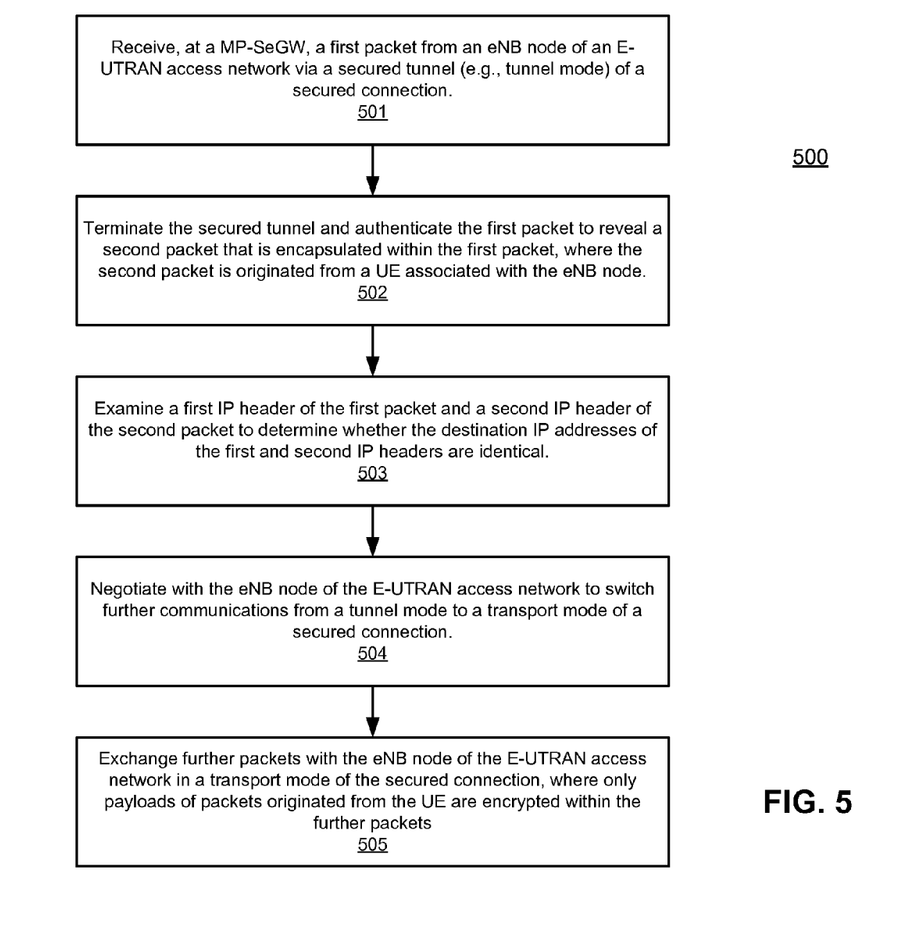
FIG. 5 is a flow diagram illustrating a method for process IPsec packets according to one embodiment of the invention.

FIG. 5 is a flow diagram illustrating a method for process IPsec packets according to one embodiment of the invention. Note that method 500 may be performed by processing logic which may include software, firmware, hardware, or a combination thereof. For example, method 500 may be performed by MPSG 301 of FIG. 3. Referring to FIG. 5, at block 501, a first packet is received at an MPSG from an eNB node of an E-UTRAN access network via a secured tunnel (e.g., IPsec tunnel) of a secured connection. At block 502, the MPSG terminates the secured tunnel and/or authenticates the first packet to reveal a second packet that is encapsulated within the first packet, where the payload of the second packet is originated from a UE coupled to the eNB node. At block 503, the MPSG examines a first IP header of the first packet and a second IP header of the second packet to determine whether destination IP addresses of both first and second IP headers are identical. If both destination IP addresses are identical, at block 504, the MPSG negotiates with the eNB node to switch further communications from a tunnel mode to a transport mode of the secured connection. At block 505, MPSG exchanges further packets with the eNB in a transport mode of the secured connection, in which only payloads of the packets originated from UEs are encrypted within the further packets.

Figure 6:
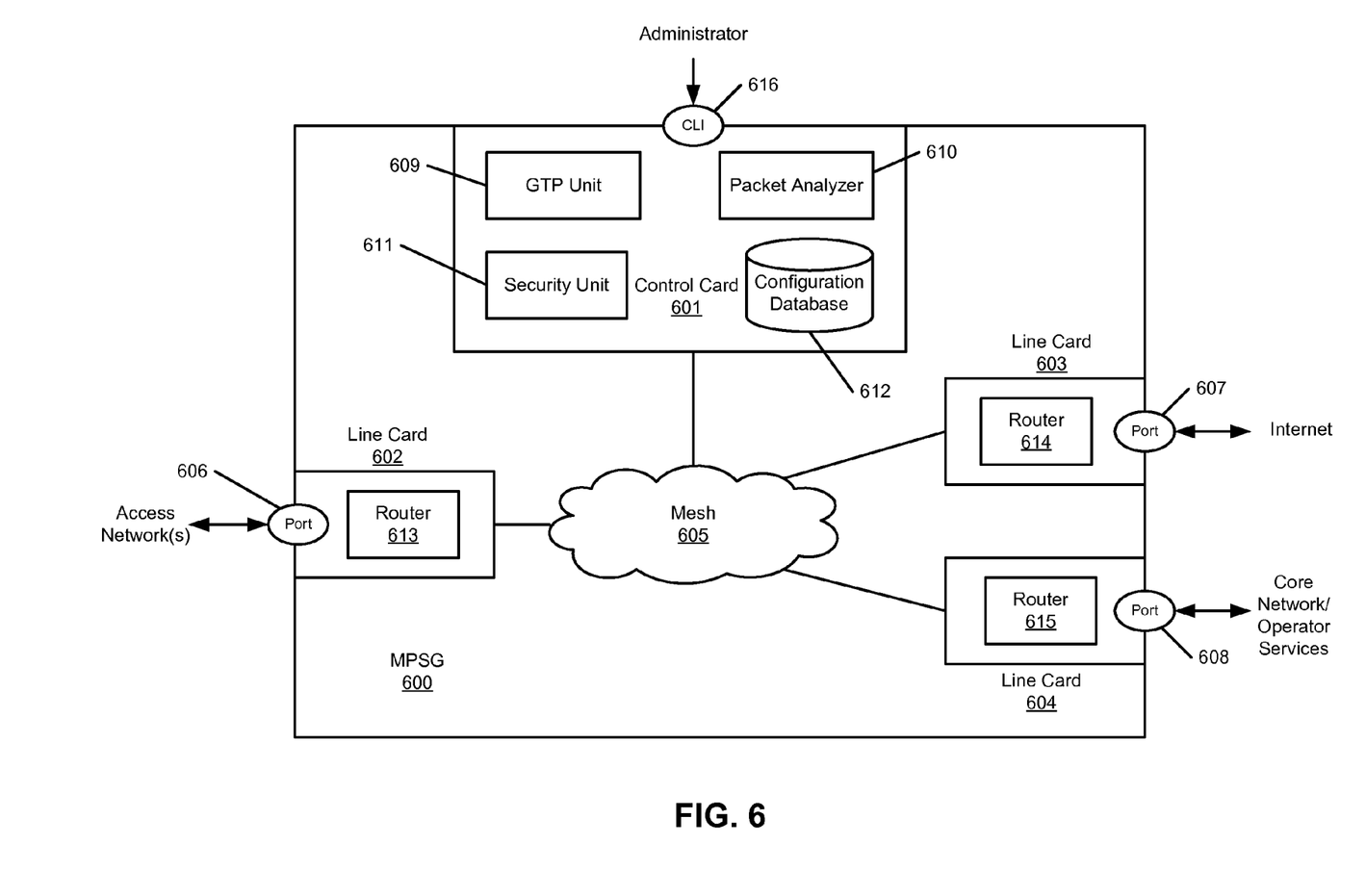
FIG. 6 is a block diagram illustrating a network node according to one embodiment of the invention.

FIG. 6 is a block diagram illustrating a network node according to one embodiment of the invention. For example, node 600 may be implemented as part of an MPSG 301 of FIG. 3. Referring to FIG. 6, node 600 includes, but is not limited to, a control card 601 (also referred to as a control plane) communicatively coupled to one or more line cards 602-604 (also referred to as interface cards or user planes) over a mesh 605, which may be a mesh network, an interconnect, a bus, or a combination thereof. Each of the line cards 603-604 is associated with one or more interfaces (also referred to as ports), such as interfaces 606-608 respectively. Each line card includes routing functional block (e.g., blocks 613-615) to route packets via the corresponding interface according to a configuration (e.g., routing table) configured by control card 601. For the purpose of illustration, it is assumed that interface 606 is to be coupled to an access network such as an E-UTRAN access network; interface 607 is to be coupled to the Internet; and interface 608 is to be coupled to a GGSN or a PDN GW of a 3G/4G packet core network for operator services.

According to one embodiment, control card 601 includes GTP unit 609, a packet inspector or analyzer 610, a security unit 611, and a configuration database 612. In one embodiment, in response to a first packet received in an IPsec tunnel mode via a secured connection from an eNB node of an E-UTRAN access network, security unit 611 is configured to terminate the secured connection, revealing a second packet encapsulated in the first packet. GTP unit 609 is configured to perform GTP processes on the payload of the second packet and may send a result to a GGSN or a PDN GW. In addition, packet analyzer 610 examine a first destination IP address of the first packet and a second destination IP address of the second packet. If both the first and second destination IP addresses are identical, security unit 611 performs an IPsec negotiation with the eNB to switch further communications from an IPsec tunnel mode to an IPsec transport mode, in which only payload of the second packet is encrypted while retaining the IP header of the second packet as the IP header of the first packet without encryption. Note that some or all of the components as shown in FIG. 6 may be implemented in software, firmware, hardware, or a combination thereof.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing" or "configuring" or "passing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for optimizing packet process overhead while securing traffic in a packet network performed within a network element, the method comprising:
    receiving, at a network element, a first packet from an evolved universal mobile telecommunications system (UMTS) terrestrial radio access network (RAN) (E-UTRAN) Node B (eNB) of an E-UTRAN access network via a secured communications tunnel of a secured connection, the first packet encapsulating a second packet therein;
    determining at the network element whether the network element serves both a security gateway functionality and a serving gateway functionality of a core packet network based on the first packet and the second packet;
    negotiating with the eNB to switch further communications from a tunnel mode to a transport mode of the secured connection if a determination is made that the network element serves both the security gateway functionality and the serving gateway functionality; and
    exchanging further packets with the eNB via the transport mode of the secured connection after the eNB switches from the tunnel mode to the transport mode.

2. The method of claim 1, wherein during the tunnel mode, the second packet is entirely encapsulated within the first packet using an Internet protocol security (IPsec) compatible encapsulating security payload (ESP) method.

3. The method of claim 2, further comprising:
    performing a corresponding ESP method to decrypt the first packet to reveal the second packet from the first packet;
    comparing a first destination IP address of a first IP header of the first packet with a second destination IP address of a second IP header of the second packet; and
    signaling that the network element serves both a security gateway functionality and a serving gateway functionality if the first destination IP address and the second destination IP address are identical.

4. The method of claim 3, wherein the first destination IP address is associated with the network element, and wherein the second destination IP address is associated with the network element or a serving gateway of the core packet network.

5. The method of claim 3, wherein exchanging further packets with the eNB comprises receiving a third packet from the eNB via an IPsec transport mode, wherein the third packet includes a third IP header identical to the second IP header without encapsulating another IP header therein.

6. The method of claim 3, further comprising:
    performing a general packet radio service (GPRS) tunnel protocol (GTP) process on a payload of the second packet; and
    transmitting a result of the GTP process to a packet data network (PDN) gateway of the core packet network.

7. The method of claim 1, wherein the network element is located at an edge of the core packet network interfacing one or more eNBs with the core packet network.

8. A network element, comprising:
    a processor; and
    a memory coupled to the processor storing instructions, which when executed from the memory, cause the processor to execute in the memory:
        a security unit to receive a first packet from an evolved universal mobile telecommunications system (UMTS) terrestrial radio access network (RAN) (E-UTRAN) Node B (eNB) of an E-UTRAN access network via a secured communications tunnel of a secured connection, the first packet encapsulating a second packet therein;
        a packet analyzer coupled to the security unit to determine at the network element whether the network element serves both a security gateway functionality and a serving gateway functionality of a core packet network based on the first packet and the second packet; and
        a routing logic coupled to the security unit and the packet analyzer to negotiate with the eNB to switch further communications from a tunnel mode to a transport mode of the secured connection if it is determined that the network element serves both the security gateway functionality and the serving gateway functionality, wherein the routing logic exchanges further packets with the eNB via the transport mode of the secured connection after the eNB switches from the tunnel mode to the transport mode.

9. The network element of claim 8, wherein during the tunnel mode, the second packet is entirely encapsulated within the first packet using an Internet protocol security (IPsec) compatible encapsulating security payload (ESP) method.

10. The network element of claim 9, wherein the processor further executes in the memory a security unit to perform a corresponding ESP method to decrypt the first packet to reveal the second packet from the first packet, wherein the packet analyzer compares a first destination IP address of a first IP header of the first packet with a second destination IP address of a second IP header of the second packet, and wherein the packet analyzer indicates that the network element serves both a security gateway functionality and a serving gateway functionality if the first destination IP address and the second destination IP address are identical.

11. The network element of claim 10, wherein the first destination IP address is associated with the network element, and wherein the second destination IP address is associated with the network element or a serving gateway of the core packet network.

12. The network element of claim 10, wherein exchanging further packets with the eNB comprises receiving a third packet from the eNB via an IPsec transport mode, wherein the third packet includes a third IP header identical to the second IP header without encapsulating another IP header therein.

13. The network element of claim 10, wherein the processor further executes in the memory a GTP unit to perform a general packet radio service (GPRS) tunnel protocol (GTP) process on a payload of the second packet and to transmit a result of the GTP process to a packet data network (PDN) gateway of the core packet network.

14. The network element of claim 8, wherein the network element is located at an edge of the core packet network interfacing one or more eNBs with the core packet network.

15. A non-transitory machine-readable storage medium having instructions stored therein, which when executed by a machine, cause a machine to perform a method for optimizing packet process overhead while securing traffic in a packet network performed within a network element, the method comprising:
receiving, at a network element, a first packet from an evolved universal mobile telecommunications system (UMTS) terrestrial radio access network (RAN) (E-UTRAN) Node B (eNB) of an E-UTRAN access network via a secured communications tunnel of a secured connection, the first packet encapsulating a second packet therein;
determining at the network element whether the network element serves both a security gateway functionality and a serving gateway functionality of a core packet network based on the first packet and the second packet;
negotiating with the eNB to switch further communications from a tunnel mode to a transport mode of the secured connection if it is determined that the network element serves both the security gateway functionality and the serving gateway functionality; and
exchanging further packets with the eNB via the transport mode of the secured connection after the eNB switches from the tunnel mode to the transport mode.

16. The non-transitory machine-readable storage medium of claim 15, wherein during the tunnel mode, the second packet is entirely encapsulated within the first packet using an Internet protocol security (IPsec) compatible encapsulating security payload (ESP) method.

17. The non-transitory machine-readable storage medium of claim 16, wherein the method further comprises:
performing a corresponding ESP method to decrypt the first packet to reveal the second packet from the first packet;
comparing a first destination IP address of a first IP header of the first packet with a second destination IP address of a second IP header of the second packet; and
signaling that the network element serves both a security gateway functionality and a serving gateway functionality if the first destination IP address and the second destination IP address are identical.

18. The non-transitory machine-readable storage medium of claim 17, wherein the first destination IP address is associated with the network element, and wherein the second destination IP address is associated with the network element or a serving gateway of the core packet network.

19. The non-transitory machine-readable storage medium of claim 17, wherein exchanging further packets with the eNB comprises receiving a third packet from the eNB via an IPsec transport mode, wherein the third packet includes a third IP header identical to the second IP header without encapsulating another IP header therein.

20. The non-transitory machine-readable storage medium of claim 17, wherein the method further comprises:
performing a general packet radio service (GPRS) tunnel protocol (GTP) process on a payload of the second packet; and
transmitting a result of the GTP process to a packet data network (PDN) gateway of the core packet network.

21. The non-transitory machine-readable storage medium of claim 15, wherein the network element is located at an edge of the core packet network interfacing one or more eNBs with the core packet network.

* * * * *